(12) United States Patent
Taylor et al.

(10) Patent No.: US 6,660,694 B1
(45) Date of Patent: Dec. 9, 2003

(54) THERMALLY RESPONSIVE AQUEOUS SILICATE MIXTURE

(75) Inventors: Kevin C. Taylor, Dha (SA); Hisham A. Nasr-El-Din, Dha (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 10/211,182

(22) Filed: Aug. 2, 2002

(51) Int. Cl.[7] .............................. C09K 3/00; E21B 33/13
(52) U.S. Cl. ..................... 507/237; 507/241; 166/293
(58) Field of Search ................. 507/237, 241; 166/293

(56) References Cited

U.S. PATENT DOCUMENTS

| | | | | |
|---|---|---|---|---|
| 4,137,087 A | * | 1/1979 | Blasko et al. ............... | 166/293 |
| 4,293,440 A | * | 10/1981 | Elphingstone et al. ...... | 166/293 |
| 4,384,894 A | * | 5/1983 | Vickers et al. .............. | 166/293 |
| 4,640,361 A | * | 2/1987 | Smith et al. ................. | 166/293 |
| 4,676,832 A | * | 6/1987 | Childs et al. ............... | 166/293 |
| 5,529,125 A | * | 6/1996 | Di Lullo Arias et al. ... | 507/237 |

* cited by examiner

*Primary Examiner*—Philip Tucker
(74) *Attorney, Agent, or Firm*—Abelman, Frayne & Schwab

(57) ABSTRACT

Sealing a zone in a subterranean well-formation is effected with an aqueous silicate solution containing an alkali metal silicate, at least one activator and a mixture of a chelating agent and a phosphonate. This composition greatly increases the divalent ion tolerance of the silicate gelling system.

14 Claims, No Drawings

THERMALLY RESPONSIVE AQUEOUS SILICATE MIXTURE

BACKGROUND OF THE INVENTION

1. Field of the Invention

This invention relates to a composition and method for greatly increasing the divalent ion tolerance of silicate gelling systems. More specifically, the method and composition of the present invention greatly increases the effectiveness of such gelling systems employed in petroleum reservoirs.

2. Description of the Prior Art

In oil field operations the production of excess quantities of water causes major economic loss due to decreased oil production, increased lifting costs, and increased separation and disposal costs associated with large amounts of produced water. Other production-related problems include increased corrosion rates and an increased tendency for emulsion and scale formation. Therefore, there is a critical need to reduce excessive water production.

Gelling polymers for water shutoff in petroleum reservoirs have been extensively evaluated. Based on such evaluations, the sodium silicate gel system has been identified as providing significant advantages for use in water shutoff. These advantages include significantly lower cost, better control over gel time, environmental safety, high temperature stability and stability of the gel components during shipment and storage. However, silicate gels also have an important disadvantage. Specifically they are sensitive to high calcium and magnesium concentrations.

U.S. Pat. No. 4,640,361 discloses that the addition of divalent ions, such as calcium or magnesium ion, to sodium silicate solutions will cause immediate gelation of the solution. However, this is highly undesirable in treating well formations, because many formations contain brines that are high in divalent ion concentration. As the sodium silicate solution comes in contact with the formation brine, premature gelling will result that prevents the sodium silicate solution from completely entering the formation.

Aqueous silicate solutions that are gelled or solidified with acid-producing activators are well-known and have been used in various applications, including grouting processes and in sealing and consolidation processes in subterranean well formations. Some examples of such applications are disclosed in U.S. Pat. Nos. 3,202,214; 3,375,872 and 3,435,899.

In alkaline solution, sodium silicate contains various molecular weight silica polymers. When sodium silicate is acidified to a pH value of less than 10.6, a three-dimensional network of silica polymers forms that creates a gel. A slight decrease in the pH greatly reduces gel time. As a result, gel times are difficult to control by the addition of acid.

Thermally responsive sodium silicate solutions employ an activator that results in gelation only after the solution is heated. Thermally responsive activators are disclosed in U.S. Pat. Nos. 4,293,440; 4,384,894; 4,640,361 and 5,320,171.

Gels have been used as blocking and diverting agents to treat injection and production wells for more than five decades (U.S. Pat. No. 2,402,588). Several factors determine the success of a gel treatment in the field, including candidate selection, identification of the source water, proper choice of the gelling system and placement of the gel into the target zone.

U.S. Pat. No. 4,137,087 employs alkali silicates, metal ions from the group $Al^{3+}$, $Fe^{3+}$, $Cr^{3+}$ and $Sn^{2+}$, and ligands from the group consisting of ethylenediaminetetraacetate, diethylenetriaminepentaacetate, N-(hydroxyethyl) ethylenediaminetetraacetate, nitrilotriacetate, and 1-3-propanediaminetetraacetate, which cures the silicate solution by evaporation. There is no disclosure of temperature activated gelation in U.S. Pat. No. 4,137,087.

U.S. Pat. No. 4,732,213 employs a chelating agent and a divalent ion such as calcium ion, to form a latent gelling agent. However, this patent is directed to colloidal silica gels, not sodium silicate gels. There are significant and distinct differences in the behavior of colloidal silica gels versus sodium silicate gels.

It is, accordingly, an object of the present invention to provide a composition and a method for gelling aqueous silicate compositions by using thermally responsive gelation activators which reduce the production of excess quantities of water, reduce corrosion rates and decrease the tendency for emulsion and scale formation. This gelling composition exhibits divalent ion tolerance.

SUMMARY OF THE INVENTION

The present invention contemplates the treatment of subterranean well formations to plug or seal a zone in said formation with an aqueous silicate solution containing an alkali metal silicate, at least one activator and a mixture of a chelating agent and a phosphonate to achieve the desired thermal responsiveness and produce the desired tolerance to divalent ions.

It has been found that the combined or joint use of a chelating agent and a phosphonate serves to increase the divalent ion tolerance of the silicate solutions. In other words, to inhibit the rate of gel formation or premature gelation, to a much greater extent than that which occurs when either chelating agents or phosphonates are used separately or individually.

By means of the composition and method of the present invention improved control over the gel time of silicate solutions is achieved in the presence of divalent ions. In addition, a high level of temperature stability is maintained, as well as stability of the gel components during shipment and storage.

DETAILED DESCRIPTION OF THE INVENTION

The silicates which can be employed in the composition and process of the present invention are the water-soluble silicates which form silicate polymer chains or which form a gel upon acidification. The preferred silicates are those of the alkali metals, particularly sodium, potassium, and combinations thereof. These silicates are commercially available as dry powders, or as concentrated aqueous solutions containing 38 to 55 parts solids per 100 parts of solution, and having a pH in the range of from about 10 to about 13.

In treating subterranean well formations in accordance with the present invention, the aqueous silicate solution is mixed with one or more activators to achieve the desired thermal responsiveness. Any of the activators disclosed in U.S. Pat. Nos. 4,293,440, 4,384,894, 4,640,31 and 5,320,171, the specifications of which are incorporated herein by reference, can be employed. Exemplary activators are sodium trichloroacetate, trichloroacetic acid, ethyl trichloroacetate, ethylacetate, hydrochloric acid, sodium trichloroacetate, trichloroacetic acid, ethyl trichloroacetate, mannitol, glycerol, sucrose, lactose, dextrose, fructose, galactose, mannose, maltose, xylose, and urea, with urea being preferred.

The aqueous silicate solution must also contain a mixture of at least one chelating agent and at least one phosphonate to produce the desired tolerance to divalent ions to avoid premature gelation.

Exemplary of the chelating agents which can be employed in accordance with the present invention include propanediaminetetraacetate, diethylenetriaminepentaacetate, N-hydroxyethylenediamine triacetic acid, hydroxyethyliminodiacetic acid, nitrilotriacetate, and 1-3-propanediaminetetraacetate. A concentration of from about 0.5% to about 3.0%, by weight, of chelating agent has been found to be effective in the present process.

Exemplary of the phosphonates which can be employed in conjunction with the chelating agents are sodium phosphonate, phosphonic acid, diethylenetriamine pentamethylene phophonic acid, methylenephosphonate, as well as their derivatives. A phosphonate concentration of about 40 ppm to about 200 ppm has been found to be effective in the process of the present invention.

In accordance with the composition and process of the present invention, gelation occurs at a temperature between about 100° F. to about 350° F., preferably between about 120° F. to about 200° F.

The following examples will serve to more comprehensively illustrate the principles of the invention, but are not intended to limit its scope.

Example 1

In all of the following examples, 5 mL of a sodium silicate solution (containing 9 wt % sodium silicate and 3.6 wt % urea) was added to a series of screw cap test tubes. The test tube was stirred using a vortex mixer and a calculated volume of divalent ion was added as a 4 g/L solution. Increasing amounts of a divalent ion, either calcium or magnesium ion were added to the test tube series. The samples were heated to 65° C. for one hour, allowed to cool, and their appearance was recorded. These examples demonstrate the concentration of divalent ion at which precipitation begins to occur in a sodium silicate solution.

TABLE 1

Divalent Ion Sensitivity of Calcium Silicate Solutions

| Divalent Ion | Concentration Required to Cause Precipitation |
|---|---|
| Calcium Ion | 80 mg/L |
| Magnesium Ion | 225 mg/L |

The results set forth in Table 1 above demonstrate that sodium silicate solutions react at low concentrations of calcium and magnesium ion to form a precipitate.

Example 2

The procedure of Example 1 was followed. In addition, however, increasing concentrations of nitrilotriacetic acid trisodium salt monohydrate (NTA) were employed. The results obtained are set forth in Table 2.

TABLE 2

Divalent Ion Sensitivity of Calcium Silicate Solutions with NTA

| NTA Concentration, wt % | Divalent Ion Concentration Required to Cause Precipitation | |
|---|---|---|
| | Calcium | Magnesium |
| 0.5 | 500 | — |
| 1.0 | 670 | 364 |
| 2.0 | 800 | — |
| 3.0 | 1330 | 670 |

It can be seen from Table 2 that NTA increases the tolerance of sodium silicate to both calcium and magnesium ions; as the NTA concentration increases, the divalent ion tolerance also increases.

Example 3

The procedure of Example 1 was followed. In addition, however, increasing concentrations of ethylenediamine tetraacetic acid tetrasodium salt (EDTA) were employed. The results obtained are set forth in Table 3.

TABLE 3

Divalent Ion Sensitivity of Calcium Silicate Solutions with EDTA

| EDTA Concentration, wt % | Divalent Ion Concentration Required to Cause Precipitation | |
|---|---|---|
| | Calcium | Magnesium |
| 0.5 | 552 mg/L | — |
| 1.0 | 800 mg/L | 360 |
| 2.0 | 923 mg/L | — |
| 3.0 | More than 1600 mg/L | 923 |

It can be seen from Table 3 that EDTA increases the tolerance of sodium silicate to both calcium and magnesium ions, and is more effective than NTA on an equivalent weight basis.

Example 4

The procedure of Example 1 was followed, however, increasing concentrations of sodium phosphonate were employed. The results obtained are set forth in Table 4.

TABLE 4

Divalent Ion Sensitivity of Calcium Silicate Solutions with Sodium Phosphonate

| Sodium Phosphonate Concentration ppm | Divalent Ion Concentration Required to Cause Precipitation | |
|---|---|---|
| | Calcium | Magnesium |
| 40 | 80 mg/L | 225 mg/L |
| 100 | 80 mg/L | 365 mg/L |
| 200 | 365 mg/L | — |

It can be seen from Table 4 that sodium phosphonate shows a small increase in divalent ion tolerance at concentrations above 100 ppm.

Example 5

The procedure of Example 1 was followed, but a combination of sodium phosphonate and EDTA was employed. The following results were obtained.

| EDTA (wt %)/Sodium Phosphonate (ppm) | Divalent Ion Concentration Required to Cause Precipitation | |
|---|---|---|
| | Calcium | Magnesium |
| 0.5/100 | 610 mg/L | 491 mg/L |
| 1.0/40 | 920 mg/L | 552 mg/L |

It can be seen from Table 5 that EDTA and sodium phosphonate in combination show improved results over EDTA alone. (Compare Table 3.) The addition of sodium phosphonate at low concentrations significantly improves the divalent ion tolerance of sodium silicate solutions. Sodium phosphonate alone at 40 ppm did not improve divalent ion tolerance, but when added to EDTA resulted in a significant improvement.

Example 6

The procedure of Example 1 was followed, but using a combination of sodium phosphonate and NTA. The results obtained are set forth in Table 6

TABLE 6

Divalent Ion Sensitivity of Calcium Silicate Solutions with NTA and Sodium Phosphonate

| NTA (wt %)/Sodium Phosphonate (ppm) | Divalent Ion Concentration Required to Cause Precipitation | |
|---|---|---|
| | Calcium | Magnesium |
| 0.5/40 | 491 mg/L | 610 mg/L |
| 1.0/40 | 970 mg/L | 428 mg/L |

It can be seen from Table 6 that NTA and sodium phosphonate in combination show improved results over NTA alone. (Compare Table 4). The addition of sodium phosphonate at low concentrations significantly improves the divalent ion tolerance of sodium silicate solutions. Sodium phosphonate alone at 40 ppm did not improve divalent ion tolerance, but when added to NTA resulted in a significant improvement.

The invention is not limited to the above-described specific embodiments thereof. It should be understood that the detail involved in the description of these embodiments is presented for illustrative purposes only, and that reasonable variations and modifications, which will be apparent to those skilled in the art, can be made without departing from the spirit and scope thereof.

What is claimed is:

1. A composition for increasing the gel formation tolerance of aqueous alkali metal silicate solutions for divalent ions present in subterranean formations, which comprises:
   (a) aqueous alkali metal silicate solution;
   (b) a thermally responsive gelation activator; and
   (c) a mixture of phosphonate and a chelating agent selected from the group consisting of ethylene diamine tetraacetic acid, propane diamine tetraacetate, diethyltriamine pentaacetate, N-hydroxyethylene diamine triacetate, hydroxyethylimino diacetic acid, nitrilo triacetate and 1,3-propanediamine tetraacetate.

2. The composition of claim 1, wherein the alkali metal silicate is sodium silicate.

3. The composition of claim 1, wherein the phosphonate is selected from the group consisting of sodium phosphonate, phosphonic acid, diethylenetriamine pentamethylene phosphonic acid, methylenephosphonate and their derivatives.

4. The composition of claim 1, wherein the concentration of the phosphonate is about 40 to about 200 ppm.

5. The composition of claim 1, wherein the concentration of the chelating agent is about 0.5 to 3.0%, by weight.

6. The composition of claim 1, wherein gelation occurs at a temperature of about 100° F. to about 350° F.

7. The composition of claim 1, wherein gelation occurs at a temperature of about 120° F. to about 200° F.

8. A method of plugging or sealing a zone in a subterranean formation with an aqueous alkali silicate solution which has an increased gel formation tolerance to divalent ions present in said formation, which comprises:
   (a) introducing into said zone an aqueous alkali metal silicate composition comprising,
      (i) an aqueous alkali metal silicate solution,
      (ii) a thermally responsive gelation activator; and
      (iii) a mixture of a phosphonate and a chelating agent selected from the group consisting of ethylenediamine tetracetic acid, propane diamine tetracetate, diethyltriamine pentaacetate, N-hydroxyethylenediamine triacetate, hydroxyethylimino diacetic acid, nitrilo triacetate and 1,3-propanediamine tetraacetate; and
   (b) activating said gelation activator in response to a thermal change of said composition within said formation whereby said silicate composition forms a gel in said zone.

9. The method of claim 8, wherein the alkali metal silicate is sodium silicate.

10. The method of claim 8, wherein the phosphonate is selected from the group consisting of sodium phosphonate, phosphonic acid, diethylenetriamine pentamethylene phosphonic acid, methylenephosphonate and their derivatives.

11. The method of claim 8, wherein the concentration of the phosphonate is about 40 to about 200 ppm.

12. The method of claim 8, wherein the concentration of the chelating agent is about 0.5 to 3.0%, by weight.

13. The method of claim 8, wherein gelation occurs at a temperature of about 100° F. to about 350° F.

14. The method of claim 8, wherein gelation occurs at a temperature of about 120° F. to about 200° F.

* * * * *